United States Patent [19]

van Gasse

[11] Patent Number: 4,927,701
[45] Date of Patent: May 22, 1990

[54] SHEET MOULDING COMPOUND AND A TOP FOR IT

[75] Inventor: René L. E. van Gasse, Opglabbeek, Belgium

[73] Assignee: DSM Resins B.V., AW Zwolle, Netherlands

[21] Appl. No.: 236,289

[22] Filed: Aug. 25, 1988

Related U.S. Application Data

[63] Continuation of Ser. No. 16,204, Feb. 18, 1987, abandoned.

[30] Foreign Application Priority Data

Feb. 27, 1986 [NL] Netherlands ............................ 8600487

[51] Int. Cl.⁵ ...................... B32B 7/02; B32B 27/08; B32B 27/36
[52] U.S. Cl. .................................. 428/212; 428/323; 428/336; 428/480
[58] Field of Search ............... 428/212, 480, 482, 323, 428/336; 156/246

[56] References Cited

U.S. PATENT DOCUMENTS 4,295,907 10/1981 Cordts et al. ........................ 156/246

Primary Examiner—Thomas J. Herbert
Attorney, Agent, or Firm—Cushman, Darby & Cushman

[57] ABSTRACT

The invention relates to a sheet moulding compound (SMC) comprising a basic layer consisting of thermosetting material, fillers, fibres and customary additives, one side of which is provided with two layers, an intermediate layer and a top layer, the intermediate layer of which lies against the basic layer, the intermediate layer comprising at least fibre reinforcement and thermosetting material in a partly cured state and the top layer comprising the same or a different thermosetting material, which is in a cured state to a smaller extent than the first layer. The invention relates also to a sheet-shaped product that can be applied as an upper layer for a moulding compound like a SMC, BMC and DMC, that consists of the above described intermediate layer and top layer.

4 Claims, 2 Drawing Sheets

SHEET MOULDING COMPOUND AND A TOP FOR IT

This is a continuation of application Ser. No. 016,204, filed Feb. 18, 1987, now abandoned.

The invention relates to a sheet moulding compound (SMC) comprising a basic layer which comprises thermosetting material, fillers, fibres and customary additives, and also to a sheet-shaped product, that can be applied as an upper layer for a SMC or for another type of moulding compound, a process for the production of this upper layer and the use hereof.

A SMC or another type of moulding compound like bulk or dough moulding compound as used during the moulding in a hot mould generally consists of a vinylic monomer and one or more thermosetting resins based on unsaturated polyesters, fillers, fibres and the like thickened with a metal oxide such as MgO. The unsaturated polyesters are condensation products of, inter alia, saturated diols and $\alpha$-$\beta$-unsaturated acids. The curing in a hot mould causes, inter alia, shrinkage, pores, a non-smooth surface and the coming to the surface of glass fibres. As non-shrink agents thermoplastics are added. As surface modifier an extra coat can be applied, in advance such as powder mould coating described in EP-B-1865 or afterwards such as most liquid coatings described, for instance, in GB-A-1986566. The coatings known so far must always be applied before or after the moulding of the SMC, which involves an extra processing step.

Attempts have indeed been made as such to apply to the SMC a layer relatively rich in resin, compared with the filled SMC, in order to prevent glass fibres from coming to the surface during the curing. This has been found not to work in practice, because the layer rich in resin is pressed away during moulding and the glass fibres will yet come to the surface. US-A-4295907 describes that this layer rich in resin can be partly cured to prevent glass fibres from coming to the surface. However, US-A-4295907 only describes the production of panels, which are not moulded. The layer rich in resin cannot be cured to such a degree as to be capable of resisting the shearing forces that occur in the moulding of the SMC.

The invention provides a sheet moulding compound which can be used in a one-step moulding process and which provides a smooth surface without any glass fibres coming to the surface.

The invention relates to a sheet moulding compound comprising a basic layer consisting of thermosetting material, fillers, fibres and customary additives, characterized in that at least one side of the basic layer is provided with two layers, an intermediate layer and a top layer, the intermediate layer of which lies against the basic layer, the intermediate layer comprises at least fibre reinforcement and a thermosetting material in a partly cured state and the top layer comprising the same or a different thermosetting material, which is in a cured state to a smaller extent.

The intermediate layer must be so strong as to be capable of resisting the shearing forces that occur during the moulding of the SMC with upper layer. That is why this layer is reinforced with a glass fibre mat or with other reinforcing fibres.

The top layer is preferably cured to such a degree that during the moulding the layer does flow, but has so much consistency that a layer thickness of 50–500, particularly 100–200 micrometers is retained. Otherwise with a too thin layer, glass fibres will come to the surface. With a two thick layer, polymerisation shrinkage will give rise to cracking.

A sheet moulding compound according to the invention is highly suitable for the production of articles that must be smooth on one side with projections and ridges on the other, which articles are not curved too much. The smooth side obtained after moulding by the curing of the top layer meets the criteria set by the autmotive industry for bodywork parts. For many years there has already been a great need as such for a SMC or other types of moulding compounds that meets the quality criteria of the automotive industry.

The invention also relates to a sheet-shaped product that can be applied as an upper layer on one side of a SMC or another type of moulding compound and is characterized in that it comprises at least two layers, of which a first layer, a so-called the intermediate layer, is suited to be applied against a side of a SMC or another type of moulding compound and a second layer, a so-called top layer, is suited as top layer, the intermediate layer comprising at least fibre reinforcements and a thermosetting material in a partly cured state and the top layer comprising the same or a different thermosetting material, which is in a cured state to a smaller extent than the intermediate layer.

The process for the production of a sheet-shaped product according to the invention that can be applied as an upper layer on one side of a SMC or another type of moulding compound is characterized in that one applies in an intermediate layer at least fibre reinforcements and a thermosetting material and in a top layer a thermosetting material in which in each layer at least two different catalyst systems are applied, with the intermediate and the top layer comprising a first system that may be the same or different, causing the material to cure above 70° C., and a second system that may be the same or different in the intermediate and in the top layer, causing the material to cure at a temperature lower than 70° C., in which process in the intermediate layer a higher degree of curing is brought about than in the top layer and both layers are partly cured, simultaneously or not, by means of the second system.

In case one wants to apply the upper layer as such with a separate moulding compound, an extra process-step is introduced each moulding cycle. However, the upper layer can be cured in one step, together with the moulding compound, and a very large flexability during working is retained. As moulding compound any compound, known by the man skilled in the art, can be applied. The best well-known are SMC, BMC and DMC.

The thermosetting resins that are applied are preferably alkenically unsaturated cross-linkable polyesters, epoxy resins, resol resins, saturated polyester resins, melamine resins, acrylate resins, polyurethane resins, diallyl phthalate resins, alone or combined, and combined or not combined with alkenically unsaturated monomers and/or prepolymers.

More preferably is chosen, as thermosetting resin an unsaturated polyester, or polymers with terminal acrylate derivate groups, the so-called vinylester polymers. Of course, mixtures of these polymers can be used also. These polymers are preferably used in combination with an alkylenically unsaturated monomer and/or prepolymer.

These polymers preferably have medium or high reactivity so that a high rate of reaction can be realized. The molecular weight per double bond is preferably lower than 600, particularly lower than 400.

Such a polymer preferably has a weight-average molecular weight of 412–8000, more specifically of 500–6000, most specifically 700–4000.

Such a polymer usually has an acid number of 0–100, preferably of 0–50, specifically of 1–25.

Such a polymer usually has a hydroxyl number of between 0 and 200, preferably between 1 and 100, specifically between 1 and 50. The hydroxyl and acid numbers are defined as mg KOH per gramme polymer according to respectively ASTM E 222-73 and ASTM D 1639-70.

The unsaturated polymers are mainly synthesized from organic compounds containing carboxyl groups and alcohol groups. For polyesters usually diacids and dialcohols are used, however up to 40% (wt) of the two types of difunctional monomers can be replaced by higher-functional monomers and monofunctional monomers are mixtures hereof. Preferably less than 20% (wt) of the two types of difunctional monomers is replaced by a higher-functional monomer. More specifically 3–10% (wt) of one of the two types of difunctional monomers is replaced by a trifunctional monomer in order to obtain a branched unsaturated polyester, because this will have as a result that within a relatively short time, a high molecular weight polymer is obtained.

Preferably at least one ethylenically unsaturated diacid is used. It may be an advantage to terminate the polyester with an unsaturated monocarboxylic acid.

A special class of polyesters is formed by the vinylester polymers. Vinylester polymers are built up of polyols and possibly polyacids, with terminal acrylate groups, methacrylate groups or other acrylates substituted at the β-site with a $C_2$-$C_4$ alkyl group. The polyols may be OH-terminal polyesters, novolak, phenol, ethers or polyethers or, for instance, half esters or polyols modified with epoxy, isocyanate, polyamine, etc.

The acids that can be applied normally contain fewer than 30 carbon atoms, specifically fewer than 20, more specifically fewer than 10 carbon atoms.

The ethylenically unsaturated diacid is preferably an α-β-ethylenically unsaturated diacid, for instance a diacid chosen from the group of fumaric acid, maleic acid, chloromaleic acid, itaconic acid, methylglutaric acid, mesaconic acid, citraconic acid or the corresponding esters or anhydrides.

As ethylenically unsaturated mono or triacid can be chosen, for instance, from the group: linoleic acid, or the other unsaturated fatty acids, cinnamic acid, atropic acid, acrylic acid, methacrylic acid, ethacrylic acid, oropacrylic acid, crotonic acid, isocrotonic acid or corresponding ester or anhydride derivatives.

Other diacids are preferably saturated-aliphatic or saturatred-aromatic. Aliphatic and aromatic diacids are chosen, for instance, from the group: succinic acid, glutaric acid, methylglutaric acid, adipic acid, sebacic acid, pimelic acid, phthalic acid, isphthalic acid, terphthalic acid, dihydrophthalic acid, tetrahydrophthalic acid, tetrachlorophthalic acid, 3,6-endomethylene-1,2,3,6-tetrahydrophthalic acid and hexachloroendomethylenetetrahydrophthalic acid or the corresponding ester or anhydride derivatives.

Aromatic carboxylic acids are used preferably for 5–50% to obtain optimum mechanical properties.

Mono and/or higher-functional aromatic or aliphatic carboxylic acids are chosen, for instance, from the group: benzoic acid, ethylhexanoic acid, mono or trimeric fatty acids, such as stearic acid, acetic acid, propionic acid, pivalic acid, valeric acid, trimellitic acid, 1,2,3,4-butanetetracarboxylic acid, 1,2,4,5-benzenetetracarboxylic acid, 1,4,5,6-naphthalenetetracarboxylic acid, 1,2,3-propanetricarboxylic acid, 1,2,3-tricarboxylic acid butane, camphoric acid, naphthoic acid, toluic acid, or the corresponding ester or anhydride derivatives.

The alcohols that can be used normally contain fewer than 30 carbon atoms, particularly fewer than 20 carbon atoms. Preference is given to the use of saturated aliphatic alcohols or alcohols containing an aromatic group, ethylenically unsaturated alcohols can be used also. Dialcohols are chosen, for instance, from the group: ethylene glycol, di(ethylene glycol), tri(ethylene glycol), 1,2-propanediol, 1,3-propanediol, 1,2-butanediol, 1,3-butanediol, 1,4-butanediol, 2-methyl-1,3-propanediol, 1,4-pentanediol, 1,4-hexanediol, 1,6-hexanediol, 2,2-dimethyl-propanediol, cyclohexanediol, 2,2-bis-(hydroxycyclohexyl)-propane, 1,2-trimethylolpropanemonoallylether, pinacol, 2,2,4-trimethylpentanediol-1,3, 3-methylpentanediol-1,5, with 1–3 equivalents of ethoxylated or propoxylated bisphenol A and novolak prepolymers possibly partly etherified and ethoxylated. Instead of 1,2-diol, the corresponding oxirane compound can be used.

Mono and higher-functional alcohols are chosen, for instance, from the group of methanol, ethanol, 1- or 2-propanol, 1- or 2-butanol, one of the isomers of pentanol, hexanol, octanol, 2-ethylhexanol, fatty alcohols, benzyl alcohols, 1,2-di(allyloxy)-3-propanol, glycerol, 1,2,3-propanetriol; pentaerythritol, tris(hydroxyethyl)isocyanurate and novolak prepolymers, possibly partly etherified and ethoxylated. Instead of 1,2-diol, the corresponding oxirane compound can be used.

It is possible also to choose di and/or higher-functional alcohols having more than 30 carbon atoms. These preferably have a molecular weight lower than 5000, more specifically lower than 2000, but higher than 400. Di and/or higher-functional alcohols having a molecular weight higher than 400 are chosen, for instance, from the group of polyethylene glycols, polypropylene glycols, addition products of ethylene oxide and/or propylene oxide with bisphenol A, or phenol-formaldehyde (pre)polymers, preferably epoxidated.

Preference is given to the use of an unsaturated polyester modified with dicyclopentadienyl (DCPD) units. The fact is that this will result in an increase of the glas-transition temperature (Tg) of the resulting article. Preference is then given to the use of an unsaturated polyester with 2–45% (wt), more specifically with 20–35% (wt) DCPD. For a further increase of the Tg, the polymer can be modified also with imide groups and/or amide groups. To this end diamines and alcohol amines can be used.

The polymers can be produced in many ways, for instance by melt condensation, solvent condensation, with or without removal of water by distillation in an azeotropic mixture, by epoxy acid reactions and other techniques known to the person skilled in the art. Vinylester polymers can be produced also as described in US-A-3179623, US-A-3301743, US-A-3367992 and US-A-3947422.

The polymer is preferably used in an amount of 10–80% (wt), specifically 20–70% (wt), of the curable mixture.

Normally the alkylenically unsaturated monomer contains fewer than 50 carbon atoms, preferably fewer than 30, and more specifically fewer than 15, but more than 3 carbon atoms. The monomer is preferably of the vinylaromatic, vinylether, vinylester, acrylate and/or allyl type. More specifically an acrylate compound or vinyl-aromatic compound is used, because these react quickly during the polymerization reaction.

Vinylaromatic compounds are chosen, for instance, from the group of styrene, α-methylstyrene, o-, m-, p-methylstyrene, p-chlorostyrene, t-butylstyrene, divinylbenzene, bromostyrene, vinylnaphthalene, α-chlorostyrene and divinylnaphthalene.

Acrylate compounds are chosen, for instance, from the group of methyl-, ethyl-, propyl, isopropyl, butyl-, isobutyl-, phenyl- or benzyl acrylate and -methacrylate, 2-ethylhexyl (meth)acrylate, dihydrodicyclopentadiene acrylate, cyclohexyl (meth)acrylate, butanediol (meth)acrylate, (meth)acrylic acid amide, butanediol di(meth)acrylate, the reaction products of (meth)acrylic acid and phenyl- or cresylglycidyl ethers, propyleneglycol di(meth)acrylate, di- and triethyleneglycol di(meth)acrylate, di- and tripropyleneglycol di(meth)acrylate, hexanediol di(meth)acrylate, trimethylolpropane tri(meth)acrylate, hexanediol di(meth)acrylate, trimethylolpropane tri(meth)acrylate. Derivatives of acrylates substituted at the β-site with $C_2$–$C_4$ can be used also.

Vinylether compounds, vinylester compounds and allyl compounds are chosen, for instance, from the group of allylphthalate, triallylcyanurate, diallylisophthalate, diallylterephthalate, diallylphthalate, ethylhexanoic acid vinylester, vinylacetate, vinylpropionate, vinylpivalate, vinylether, vinylpropylolether, vinylbutylolether and vinylbenzylalcoholethers.

The compound containing one or more vinyl groups is used preferably in an amount of 20–90% (wt), specifically 30–80% (wt), of the curable mixture.

The resin further preferably contains one or more antioxidants, such as hydroxybenzophenone, esters of salycilic acid and hydroxyphenylbenzotriazoles.

Other addtives are, for instance, release agents, such as the stearates of zinc, calcium or aluminium, phosphates, silicones, polyvinylalcohols and waxes.

The resin further preferably contains one or more inhibitors in amounts of between 0.005–0.2, preferably 0.01–0.1% (wt) calculated on the curable mixture. Known inhibitors that can be used are: hydroquinone, 2,6-dimethylhydroquinone, p-t-butylcatechol, p-benzoquinine, chloranil, 2,6-dimethylquinone, nitrobenzene, m-dinitrobenzene, thiodiphenylamine, salts of N-nitro-N-cyclohexylhydroxylamine, 2,3-dichloro-5,6-dicyan-p-benzoquinone, copper naphthenate, 1,2-nepahthoquinone.

The radical polymerization can be initiated in many ways as for instance with a chemical initiator system, but also with an electron gun. The chemical initiator system is based on the generation of radicals through thermal, catalytic or photochemical decomposition.

As second system, UV or visible-light sensitive catalyst systems (photo-initiator system) or peroxide catalyst system sensitive to low temperatures are eligible.

Preference is given to using a photo-initiator system, because it can bring about controlled and rapid curing. Many types of photo-initiator systems can be applied, as described in, for instance, DE-A-1694149, US-A-3715293, EP-A-7086, US-A-4071424, EP-A-185423 and EP-A-97012. Photo-initiator systems are mostly used in amounts of between 0.01–10% (wt), preferably between 0.1–4% (wt).

Preference is given to using a system sensitive to light with a wavelength of 280–800 nm, preferably 360–500 nm and more specifically 380–460 nm.

In another preferred embodiment the second layer is cured by means of a heat-sensitive system consisting of, for instance, hydrogen peroxide and cobalt octoate. This last-mentioned system provides curing between 40° C. and 50° C.

As the first system a thermally sensitive initiator system is used, normally in amounts of between 0.1 and 5% (wt), which is active at a temperature higher than 70° C. As alternative second system, a system may be chosen active at room temperature (cold-curing). The thermally sensitive system is preferably chosen from the group of peroxides, perketals and percarbonates. Examples of these are hydrogen peroxide, benzoyl peroxide, t-butyl-peroxide, t-butyl peractoate, t-butyl perbenzoate, dicumyl peroxide, di-t-butyl peroxide, trimethylolcyclohexanone perketal, methylethylketone peroxide, acetylacetone peroxide, cyclohexanone peroxide, methylisobutylketone peroxide, and diacetonealcohol peroxide. Further, catalysts may be added such as octoates or naphthenates of copper, lead, calcium, magnesium, cerium and particularly of manganese and cobalt, or vanadium complexes. To these accelerators may be added promotors like acetylacetone. The catalysts used may also be aromatic amines, such as dimethylaniline, diethylaniline or dimethylparatoluidine.

The basic SMC or any other type of moulding compound and the intermediate layer too, are reinforced with fibre like material, commonly with glass fibre.

In order to obtain special effects in respect of the physical properties, the glass fibres may be replaced wholly or partly by carbon fibre, sisal, jute, asbestos, cotton, organic synthetic fibres such as polyamide, polyester, polypropylene or polyethylene, inorganic fibres such as quartz and beryllium and other metal fibres. The fibres may also be present as continuous fibres or in the form of a fibre mat kept together by a suitable binding agent, or in the form of chopped continuous filaments without binding agent. The length of the fibres used, notably of the glass fibres, may be between 0.5 mm and 50 mm, but may also be much longer, for instance when they are applied in the form of mats.

The fibre can be added in amounts of up to 80% (wt) (calculated on the total composition).

Fillers are preferably used in all layer.

The fillers that may be used are, for instance, mark, antimony trioxide, quartz meal, coconut shell flour, talcum, calcium carbonate, silicon oxide, clay, calcium silicate, wood flour, glass beads, titanium dioxide, aluminiumsilicate, aluminium hydrate, carbon black or gypsum-anhydrite. The incorporated filler content may be between 5 and 70% (wt).

Further, customary low-profile additves such as, for instance, thermoplastics may be added. Examples of thermoplstics are homopolymers of methyl-, ethyl- and butylmethacrylate, methyl- and ethyl acrylate, styrene, copolymers of methyl methacrylate and other low-molecular alkyl-acrylates and -methacrylates and copolymers of methyl methacrylate with small amounts of one or more of the following monomers: lauryl methacrylate, isobornyl methacrylate, acrylamide, hydroxyethyl methacrylate, styrene, 2-ethylhexyl acrylate, acrylonitrile, methacrylic acid, methacrylamide, methylolacrylamide and cetylstearyl methacrylate, copolymers of styrene and acrylonitrile, copolymers of vinyl chloride and vinyl acetate, cellulose acetate butyrate, cellulose acetate-propionate and styrenemaleic anhydride copolymer.

All layers can further be physically or chemically thickened with customary thickeners such as, for instance, with metal oxides, such a magnesium oxide, or with metal hydroxides.

Further, the customary pigments or colourants may be added.

The process for the use of the multi-layer SMC and/or the upper layer is characterized in that in the mould respectively a SMC or an upper layer is applied covering more than 90% of the mould surface. This prevents the basic portion of the SMC, or the moulding compound, which is thickened with, for instance, magnesium oxide, from running round the most cured intermediate layer during the moulding process.

The products obtained show a very good surface. The products and processes described are particularly suitable for obtaining bonnets of motor cars and the like.

The invention will be further elucidated by means of the following examples without being limited thereto.

BRIEF DESCRIPTION OF THE DRAWING

FIG. 1 shows a diagrammatic representation of a SMC according to the invention. In it (1) is the possibly partly cured top layer, (2) the partly cured, glass-fibre-reinforced intermediate layer and (3) a basic SMC.

In FIG. 2 a device is shown with which a SMC according to the invention can be produced. In it, (4) and (4)' are rolls of film, for instance polyethylene film (PE film). (5) is a transparent sheet of glass and (6) a table. Resin (7) for the top layer is applied by means of a doctor blade 8 to PE film (4) in a thickness of for instance between 0.1 and 0.6 mm. (9) is, for instance, a source of heat, or a source of light for the partial curing of the top layer. On the partly cured layer of resin (1) a glass mat is applied, which is impregnated with resin (11) metered with doctor blade (8') in a thickness of for instance between 0.1 and 1.0 mm. At (12) the glass fibers are impregnated by pressure. At (13) the intermediate layer (2) is cured to a fairly high degree, for instance with UV light. Onto this sheet-shaped product a basic SMC is applied at once by applying resin (14) to the intermediate layer (2) and providing this resin with glass fibres (15) by means of a glass fibre chopper (16). A second layer of resin (14') is applied to a second PE film (4'), and after the compression and impregnation (17) the SMC is stored to thicken.

EXAMPLE I

Figure 1:
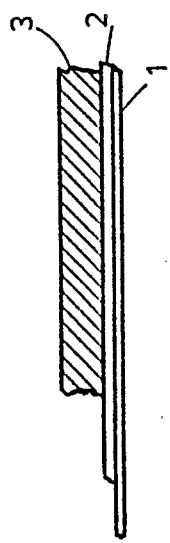
FIG. 1 is a diagramatic representation of a SMC according to the invention.
Figure 2:
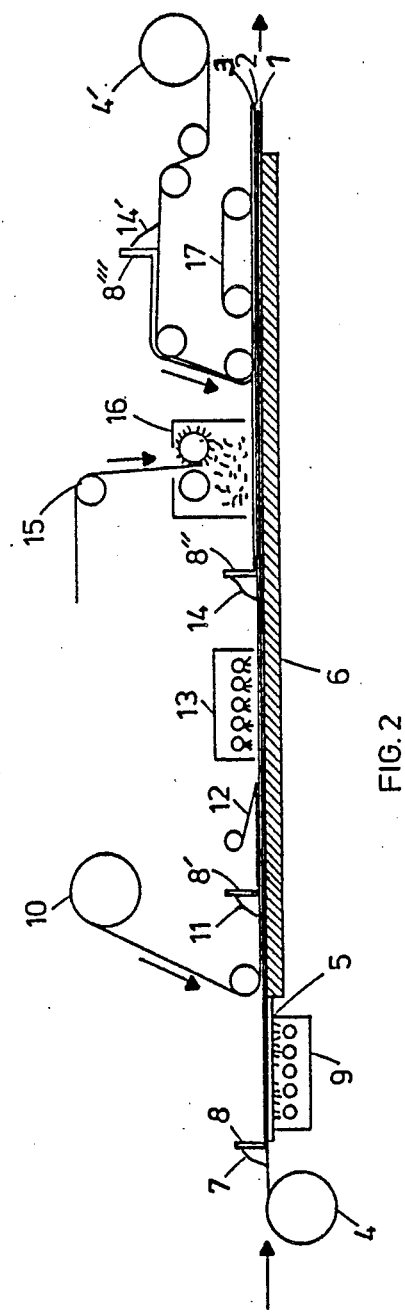
FIG. 2 shows a device for producing a SMC according to the invention.

A SMC was produced in the manner describe above, resin (7) consisting of 100 parts by weight unsaturated polyester resin produced from 336 kg isophthalic acid, 300 kg maleic anhydride, 234 kg propylene glycol and 270 kg diethylene glycol in 42% styrene, 50 parts by weight calcium carbonate powder as filler, 2 parts by weight zinc stearate, 0.2 part by weight cobalt octoate and 2 parts by weight Trigonox-C (perbenzoate, high-temperature catalyst), 4 parts by weight magnesium oxide paste (35%), 0.35 part by weight benzil and 2 parts by weight DEMA: N,N-dimethylaminoethyl methacrylate (catalyst system sensitive to visible light).

The layer of resin (1) was irradiated for 1 minute using 5 40-Watt UV lamps at a distance of 6 cm. In order to measure the amount of curing (B-stage), it was tested to what amount or when a sample of the partially cured resin, was dissolved or swollen in styrene. The resin layer appeared to be no longer soluble in styrene at 25° C., but after half an hour it clearly began to swell. The reinforced layer of resin (2) was produced by means of about 200 g/m$^2$ of the same resin as for layer (1) and a glass mat with a weight of 50 g/m$^2$. It was irradiated for 1.5 minute with light as for the 1st layer. The partly cured polyester started swelling in styrene only after 1 hour.

Subsequently, a basic SMC (3) was applied. First of all 500 g/m$^2$ resin mixture (14) was applied to the resin layer (2). The resin mixture consisted of 100 parts by weight of the polyester resin (14) used for layer (1), 20 parts by weight polyvinyl acetate in styrene as non-shrink additive. 50 parts by weight calcium carbonate, 4 parts by weight zinc stearate, 0.2 part by weight cobalt octoate, 2 parts by weight Triganoc C and 4 parts by weight magnesium oxide paste (35%). Onto this layer chopped glass fibres (15) were applied having a length of 25 mm. The weight was about 300 g/m$^2$. Onto PE film (4') 500 g/m$^2$ resin (14') was applied also, which resin was the same as (14). At (17) the glass fibres were well impregnated by the two layers (14) and (14') and the SMC was stored for some time to thicken. A slab of free product was obtained, which was very well suited for the production of relatively flat articles.

COMPARATIVE EXPERIMENT A

An experiment analogous to example I was carried out while leaving away layer (2), the reinforced intermediate layer. The top layer was crushed and glass fibres were found to occur on the surface.

COMPARATIVE EXPERIMENT B

An experiment analogous to example I was carried out with the intermediate layer being irradiated for only 20 sec. During the moulding of the SMC the intermediate layer and the top layer were pushed away, with the same poor result as in comparative experiment A.

COMPARATIVE EXPERIMENT C

Analogous to example I a SMC was produced with the top layer being irradiated for only 20 sec. During the moulding this layer flowed away almost completely, and the glass fibres of the intermediate layer came to the surface.

COMPARATIVE EXPERIMENTs D and E

Analogous to example I a SMC was produced while the glass fibres were left away from the intermediate layer and this layer was irradiated for 2 min. The top layer was irradiated for 40 seconds. During the moulding at 150 kg/cm$^2$ (experiment D) and 90 kg/cm (experiment E), the intermediate layer and the top layer were pushed away, with the same pour result as in comparative experiment A.

COMPARATIVE EXPERIMENT F

Analogous to example I a SMC was produced while the glass fibres were left away from the intermediate layer and this layer was irradiated for 1 min. The top layer was irradiated for 40 seconds. During the moulding at 75 kg/cm, nearly all the not-reinforced resin was pushed to the corners of the mould and cracks were visible after curing. In the centre of the product glass fibres were clearly visible on the surface.

I claim:

1. Sheet moulding compound (SMC) comprising:
   a basic layer consisting of thermosetting material, fillers, fibers and customary additives, having at least one side of said basic layer provided with two layers, an intermediate layer and a top layer, the intermediate layer of which lies against the basic layer, the intermediate layer comprising at least fibre reinforcement and thermosetting material in a partly cured state said intermediate layer being capable of resisting the shear forces with the top layer that occur during moulding, and the top layer comprising the same or a different thermosetting material having no fiber reinforcement, which is in a cured state to a smaller extent than the intermediate layer.

2. SMC according to claim 1, characterized in that the thermosetting material applied is unsaturated polyester.

3. SMC according to claim 1, characterized in that the intermediate layer has a thickness of 0.1–0.6 mm.

4. SMC according to claim 1, characterized in that the top layer has a thickness of 0.1–1 mm.

* * * * *